(12) United States Patent
Morikawa

(10) Patent No.: US 7,813,101 B2
(45) Date of Patent: Oct. 12, 2010

(54) SOLENOID-OPERATED VALVE ACTUATING CONTROLLER

(75) Inventor: Fumio Morikawa, Misato (JP)

(73) Assignee: SMC Kabushiki Kaisha, Tokyo (JP)

( * ) Notice: Subject to any disclaimer, the term of this patent is extended or adjusted under 35 U.S.C. 154(b) by 616 days.

(21) Appl. No.: 11/458,148

(22) Filed: Jul. 18, 2006

(65) Prior Publication Data
US 2007/0019356 A1   Jan. 25, 2007

(30) Foreign Application Priority Data
Jul. 21, 2005   (JP) ............................. 2005-211009

(51) Int. Cl.
H01H 9/00   (2006.01)
(52) U.S. Cl. ...................... 361/160; 361/152; 361/153; 361/154
(58) Field of Classification Search ................ 361/154, 361/152, 153, 160
See application file for complete search history.

(56) References Cited

U.S. PATENT DOCUMENTS

| | | | |
|---|---|---|---|
| 3,778,696 A | | 12/1973 | Walters et al. |
| 4,364,111 A | | 12/1982 | Jocz |
| 4,369,401 A | | 1/1983 | Fayfield et al. |
| 4,925,156 A | * | 5/1990 | Stoll et al. ............. 251/129.01 |
| 5,422,780 A | * | 6/1995 | Lignar ........................ 361/154 |
| 5,438,320 A | * | 8/1995 | Taylor ..................... 340/573.1 |
| 5,818,678 A | * | 10/1998 | Berg et al. .................. 361/152 |
| 6,256,185 B1 | * | 7/2001 | Maller ........................ 361/152 |
| 6,371,162 B1 | | 4/2002 | Groeneveld |
| 7,315,440 B1 | * | 1/2008 | Guo ............................ 361/154 |
| 2002/0191424 A1 | * | 12/2002 | Heinke ........................ 363/41 |

FOREIGN PATENT DOCUMENTS

| | | |
|---|---|---|
| CN | 1430740 | 7/2003 |
| CN | 2696090 | 4/2005 |
| DE | 10235196 | 2/2004 |
| JP | 5-47334 | 12/1993 |
| JP | 10-184974 | 7/1998 |

* cited by examiner

*Primary Examiner*—Jared J Fureman
*Assistant Examiner*—Christopher J Clark
(74) *Attorney, Agent, or Firm*—Paul A. Guss

(57) ABSTRACT

A solenoid-operated valve actuating controller actuates a solenoid-operated valve by energizing an actuating coil of the solenoid-operated valve in a rated mode, enough to move a movable member in the actuating coil, during a first period. Further, the actuating coil is energized in a power saving mode, during a second period after the first period. The solenoid-operated valve actuating controller has a timer circuit for setting the first period, an oscillating circuit for energizing the actuating coil in the power saving mode during the second period, and a control circuit for stopping an oscillating operation of the oscillating circuit during the first period based on an output signal from the timer circuit, and for energizing the actuating coil in the rated mode.

3 Claims, 3 Drawing Sheets

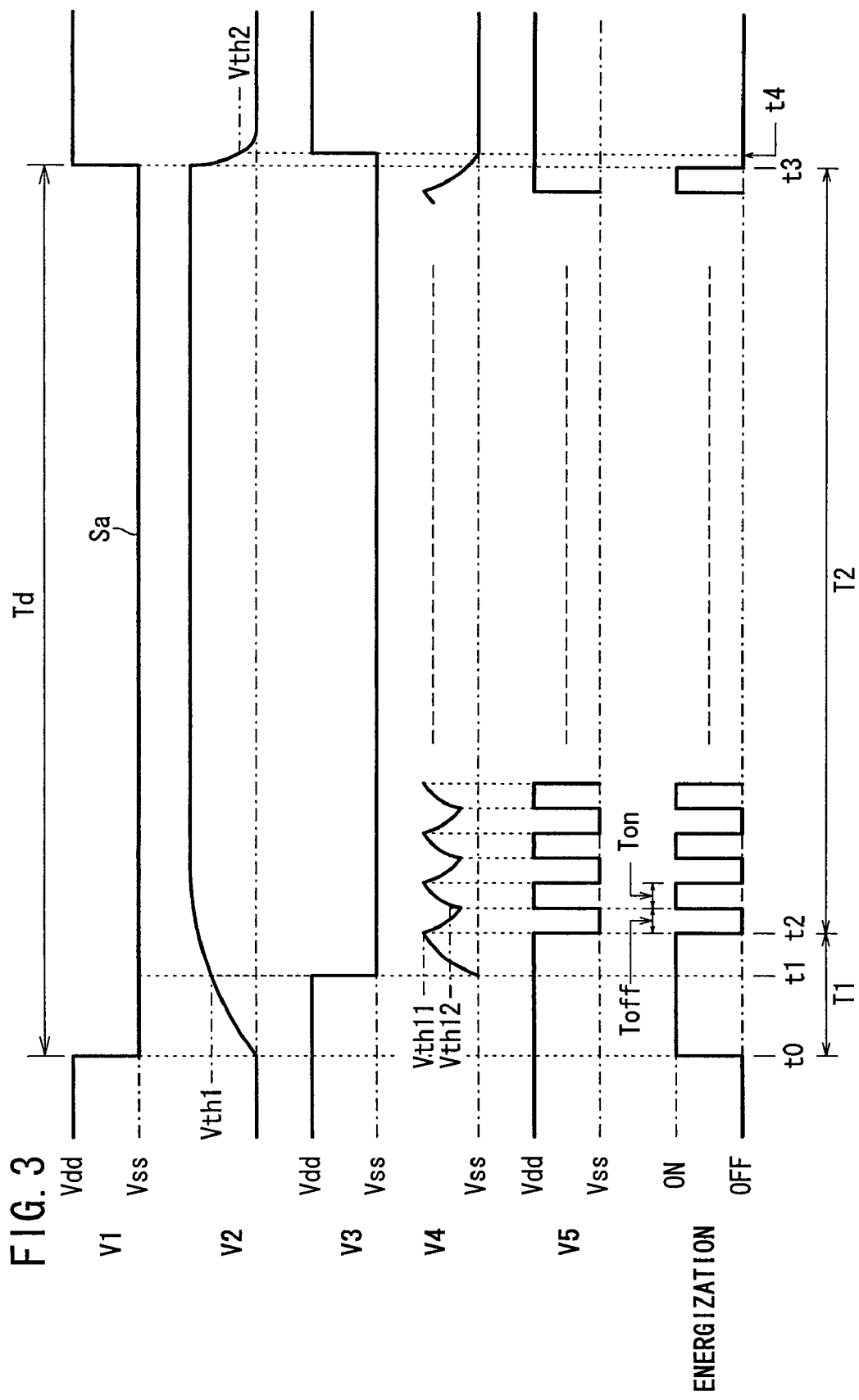

SOLENOID-OPERATED VALVE ACTUATING CONTROLLER

BACKGROUND OF THE INVENTION

1. Field of the Invention:

The present invention relates to a solenoid-operated valve actuating controller, and more particularly to a solenoid-operated valve actuating controller for actuating a solenoid-operated valve in a rated actuation mode and a power saving actuation mode.

2. Description of the Related Art:

Heretofore, one type of general solenoid-operated valve actuating controller has been disclosed in Japanese Laid-Open Utility Model Publication No. 5-47334, for example.

The disclosed solenoid-operated valve actuating controller comprises a DC power supply, a switch, an actuating coil of a solenoid-operated valve, and an operating transistor, which are connected in series with each other. The solenoid-operated valve actuating controller also includes a control transistor, for controlling the operating transistor, connected in parallel with the operating transistor.

The amount of electrical energy supplied to the actuating coil of the solenoid-operated valve is digitally controlled in order to eliminate drawbacks of a transistor-controlled system, or more specifically, to eliminate drawbacks such as temperature susceptibility, etc., and also to make the solenoid-operated valve actuating controller versatile in use.

The conventional solenoid-operated valve actuating controller also has a voltage-dividing resistor connected to the actuating coil for reducing power consumed by the solenoid-operated valve.

However, the voltage-dividing resistor of the conventional solenoid-operated valve actuating controller must have a resistance value that depends on the electric current required by the actuating coil. Since it is necessary for the rating of the voltage-dividing resistor to be determined in view of heat generated thereby as well as other factors, the size of the voltage-dividing resistor usually tends to be large.

In addition, efforts in recent years to reduce the size of solenoid-operated valves have made it difficult to mount a voltage-dividing resistor on the actuating coil of the solenoid-operated valve.

SUMMARY OF THE INVENTION

It is therefore an object of the present invention to provide a solenoid-operated valve actuating controller, which is effective in reducing the amount of space required for mounting the solenoid-operated valve, and also to reduce the cost of the solenoid-operated valve.

According to the present invention, there is provided a solenoid-operated valve actuating controller for actuating a solenoid-operated valve by energizing an actuating coil of the solenoid-operated valve in a rated mode, at a rated voltage which is high enough to move a movable member in the actuating coil, during a first period from a time when an actuation command signal is initially applied to the solenoid-operated valve, and energizing the actuating coil in a power saving mode, in repetitive cycles at a smaller duty ratio than in the rated mode, during a second period after the first period, wherein the solenoid-operated valve actuating controller includes a timer circuit for setting the first period, an oscillating circuit for energizing the actuating coil in the power saving mode during the second period, and a control circuit for stopping an oscillating operation of the oscillating circuit during the first period based on an output signal from the timer circuit, and for energizing the actuating coil in the rated mode.

The timer circuit, the oscillating circuit, and the control circuit may be implemented using inexpensive gate ICs and transistors. Therefore, both the mounting space required by the solenoid-operated valve and the cost of the solenoid-operated valve can be reduced.

The solenoid-operated valve actuating controller may further comprise a switching device for energizing the actuating coil. The oscillating circuit outputs intermittent pulses for energizing the actuating coil to the switching device during the second period in the power saving mode, and the control circuit controls outputting of a pulse for energizing the actuating coil to the switching device during the first period in the rated mode.

The timer circuit includes a charging circuit, having at least a capacitor, for charging from a time when the actuation command signal is initially applied to the solenoid-operated valve, and a first comparing circuit for supplying the control circuit with a signal for stopping the oscillating operation of the oscillating circuit, until a charged voltage in the charging circuit reaches a prescribed voltage which is charged by the charging circuit during the first period.

The timer circuit may further comprise a discharging diode for discharging therethrough electric charges stored in the capacitor at a time when application of the actuation command signal to the solenoid-operated valve is halted. Depending on specifications of the actuating controller, the first period is set to a longer period, and hence the capacitor needs to be of a larger capacitance. If the capacitor were to be discharged of its own accord, it would take a long time until the capacitor becomes completely discharged. Therefore, it is necessary to set a long time period from the time when application of the actuation command signal is ended until initiation of the next actuation command signal, which tends to limit the speed of operation of the solenoid-operated valve.

However, the discharging diode allows electric charges stored in the capacitor to be discharged within a short period of time. Therefore, even if the capacitor has a large capacitance, it can still be reset quickly.

The first comparing circuit may include a diode connected to an input terminal thereof, for discharging therethrough electric charges that are stored in the capacitor at a time when application of the actuation command signal to the solenoid-operated valve is halted. Since the electric charges stored in the capacitor are discharged in a short period of time, even if the capacitor has a large capacitance, the capacitor can still be reset quickly. Since the diode included in the first comparator may double as a discharging diode, the circuit arrangement for the actuating controller may be made simpler and less costly.

The oscillating circuit may include a Schmitt trigger type second comparing circuit, a capacitor connected to an input terminal of the second comparing circuit, a discharging first resistor connected between the input terminal and an output terminal of the second comparing circuit, and a series-connected circuit having a charging second resistor and a diode, the series-connected circuit being connected between the input terminal and the output terminal of the second comparing circuit.

If the input voltage of the second comparing circuit is of a low level and the output voltage is of a high level, then an electric current flows from the output terminal of the second comparing circuit, through the series-connected circuit, and to the capacitor, thereby charging the capacitor. The capacitor is charged in accordance with the time constant CR of the second resistor and the capacitor. The charged voltage across the capacitor appears as the input voltage of the second comparing circuit. When the input voltage of the second comparing circuit exceeds a first threshold value, then the output voltage of the second comparing circuit drops to the low level. Thereafter, the electric charge stored in the capacitor is discharged through the first resistor, the output terminal of the second comparing circuit, and a low-level power supply of the second comparing circuit, thereby lowering the charged voltage across the capacitor, i.e., lowering the input voltage of the second comparing circuit. When the input voltage of the second comparing circuit drops below a second threshold value, then the output voltage of the second comparing circuit increases to the high level. The above sequence of operations is repeated in order to energize the actuating coil in the power saving mode.

The time constant for charging the capacitor, or in other words the time constant CR of the second resistor and the capacitor, and the time constant for discharging the capacitor, or in other words the time constant of the first resistor and the capacitor, may be different from each other. The time at which the actuating coil is energized during the second period, at a smaller duty ratio than in the rated mode, can be freely set to any desired period. Consequently, the solenoid-operated valve actuating controller, which energizes the actuating coil in the power saving mode as desired, can be constructed inexpensively.

Therefore, the solenoid-operated valve actuating controller according to the present invention is effective to reduce the mounting space required by the solenoid-operated valve, and also to reduce the cost of the solenoid-operated valve.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing signal waveforms produced during operation of the solenoid-operated valve actuating controller according to the embodiment of the present invention.

DESCRIPTION OF THE PREFERRED EMBODIMENT

Figure 1:
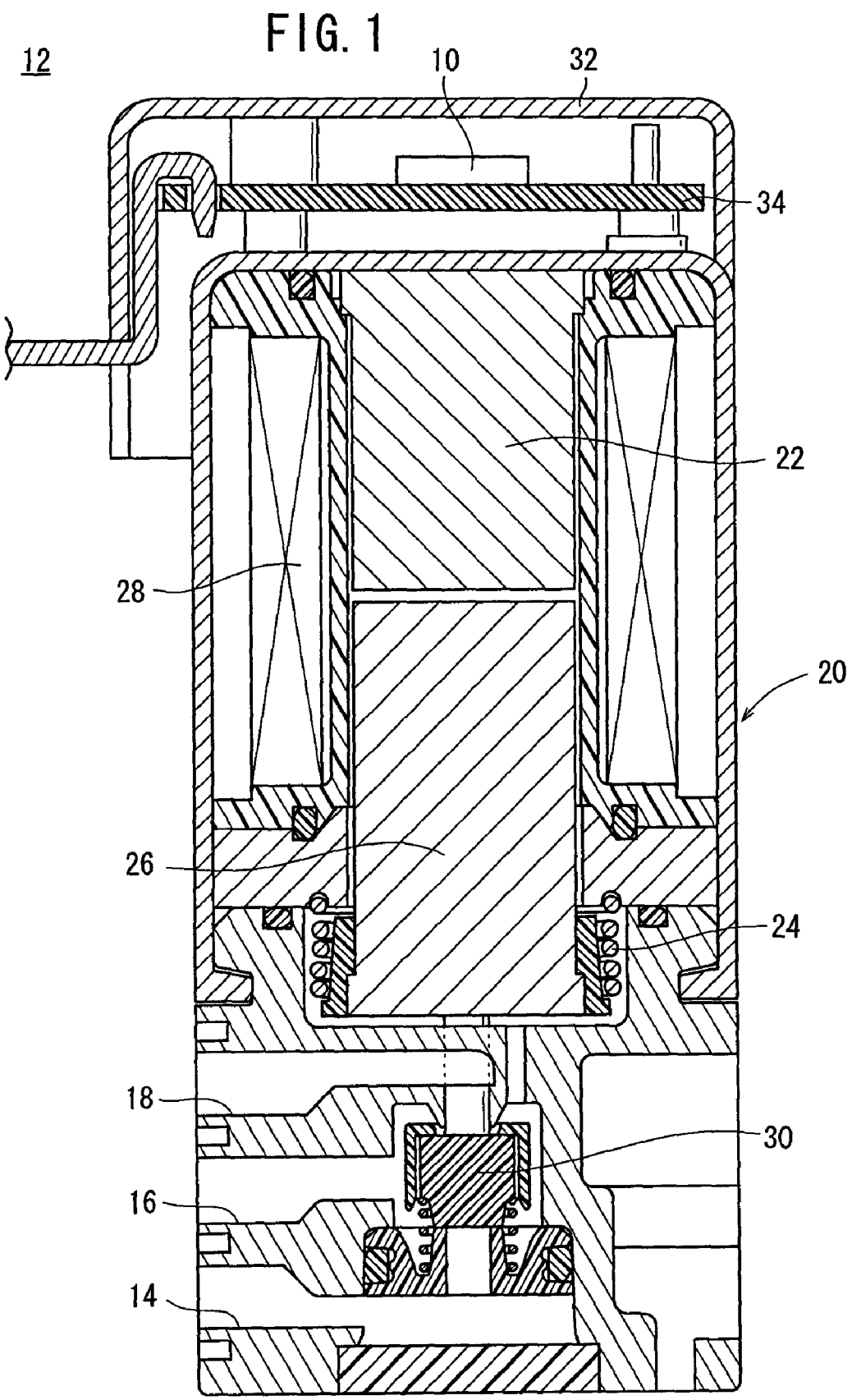
FIG. 1 is a longitudinal cross-sectional view of a solenoid-operated valve incorporating a solenoid-operated valve actuating controller according to an embodiment of the present invention.

A solenoid-operated valve actuating controller (hereinafter referred to as an "actuating controller") according to an embodiment of the present invention shall be described below with reference to FIGS. 1 through 3.

Prior to describing the actuating controller, which is generally denoted by 10 in FIGS. 1 and 2, a solenoid-operated valve 12 incorporating the actuating controller 10 shall be described below with reference to FIG. 1.

The solenoid-operated valve 12 includes a valve body 20 having a pressure fluid inlet port 14, a pressure fluid outlet port 16, and an air discharge port 18 defined therein. The valve body 20 houses therein a fixed iron core 22, a movable member 26 normally urged to move away from the fixed iron core 22 under the resiliency of a spring 24, an actuating coil 28 disposed around the fixed iron core 22 and the movable member 26, and a valve plug 30 that can be unseated off a valve seat when the movable member 26 is magnetically attracted to the fixed iron core 22 by energizing the actuating coil 28. A circuit board 34 incorporating the actuating controller 10 thereon is disposed between the cap 32 and the valve body 20.

Figure 2:
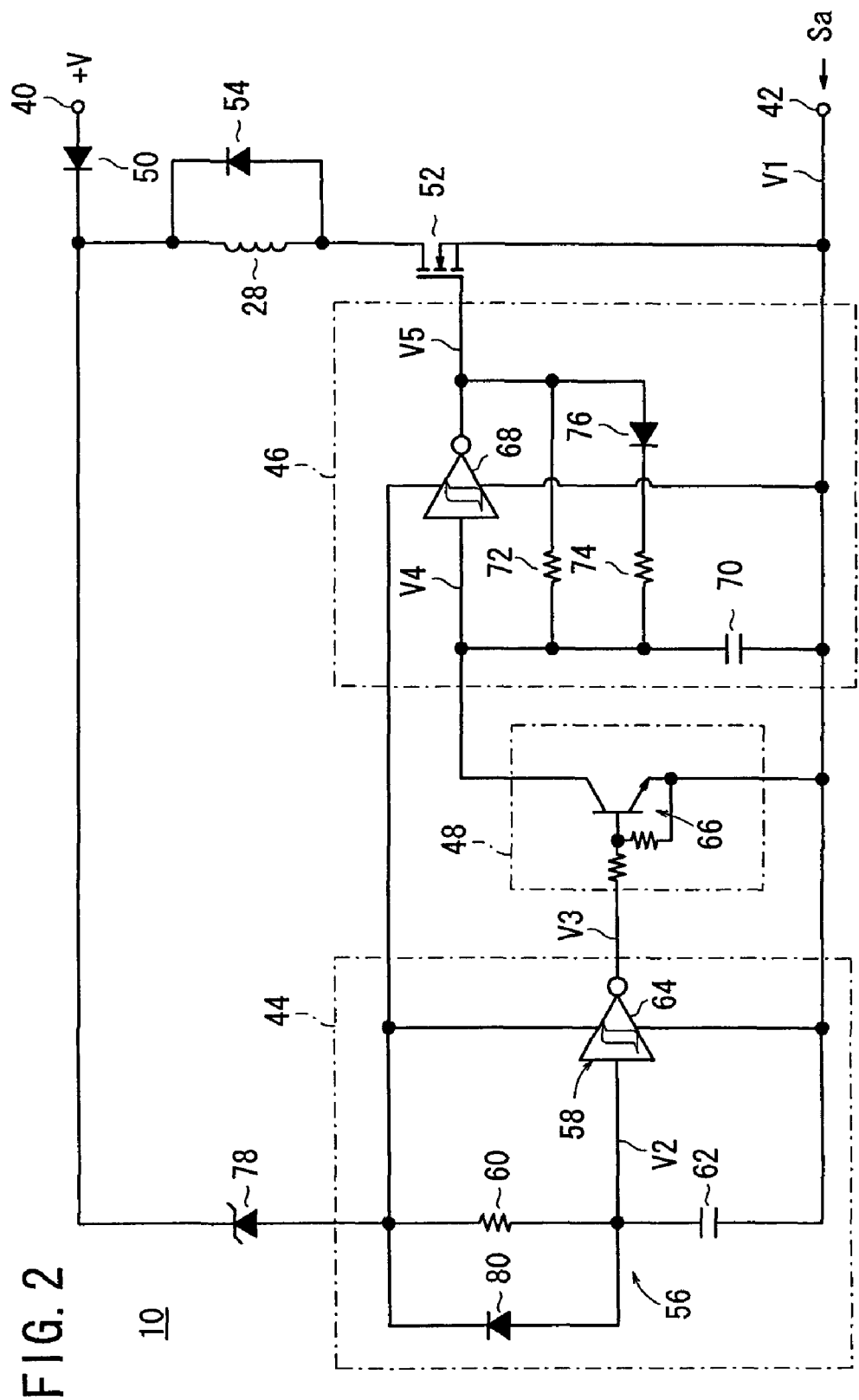
FIG. 2 is a circuit diagram of the solenoid-operated valve actuating controller according to the embodiment of the present invention.

As shown in FIG. 2, the actuating controller 10 includes a power supply terminal 40, a control input terminal 42, a timer circuit 44, an oscillating circuit 46, and a control circuit 48.

The power supply terminal 40 is connected to the control input terminal 42 through a series-connected circuit, made up of a first diode 50 that prevents reverse current flow, the actuating coil 28 of the solenoid-operated valve 12 (see FIG. 1), and a first transistor 52, e.g., an n-channel MOS transistor, which selectively energizes and de-energizes the actuating coil 28. A rated voltage of the actuating coil 28 of the solenoid-operated valve 12 (e.g., a power supply voltage +V of DC 24 V) is applied to the power supply terminal 40. A low potential, e.g., a ground potential Vss, is applied as an actuation command signal Sa to the control input terminal 42 during an actuation command period Td (see FIG. 3). In periods other than the actuation command period Td, a higher potential Vdd, e.g., a potential that is the same or higher than the potential applied to the gate of the first transistor 52, is applied to the control input terminal 42. A second diode 54, as a surge absorber, is connected in parallel with the actuating coil 28. The second diode 54 serves to discharge electromagnetic energy stored in the actuating coil 28 when the first transistor 52 is turned off.

The timer circuit 44 comprises a charging circuit 56 and a first comparing circuit 58. The charging circuit 56 serves to charge electric energy from a starting time t0 (see FIG. 3) of the actuation command period Td. The first comparing circuit 58 supplies a signal to the control circuit 48, in order to stop an oscillating operation of the oscillating circuit 46, and until a charged voltage V2 of the charging circuit 56 reaches a prescribed voltage. The prescribed voltage corresponds to a voltage at which the charging circuit 56 is charged during a first period T1 (see FIG. 3).

Specifically, as shown in FIG. 2, the charging circuit 56 includes a series-connected circuit made up of a first resistor 60 and a first capacitor 62. The first comparing circuit 58 comprises a first comparator 64, of the Schmitt trigger type, having an input terminal connected to the junction between the first resistor 60 and the first capacitor 62. Although, in FIG. 2, the first comparator 64, of the Schmitt trigger type, is used as the first comparing circuit 58, the first comparing circuit 58 may alternatively comprise an ordinary comparator, which compares the input voltage with a single threshold voltage.

In FIG. 2, the control circuit 48 comprises a second transistor 66, e.g., an NPN transistor. The second transistor 66 has a base connected to the output terminal of the first comparator 64 of the timer circuit 44, and an emitter connected to the control input terminal 42.

The oscillating circuit 46 comprises a second comparator 68, of the Schmitt trigger type, a second capacitor 70 connected between the input terminal of the second comparator 68 and the control input terminal 42, a second resistor 72 for discharging electric energy, and which is connected between the input terminal and the output terminal of the second comparator 68, and a series-connected circuit connected between the input and output terminals of the second comparator 68, comprising a third resistor 74 for charging electric energy and a third diode 76, which are connected in parallel with the second resistor 72. The input terminal of the second comparator 68 is connected to the collector of the second transistor 66 of the control circuit 48. The output terminal of the second comparator 68 is connected to the gate of the first transistor 52.

The actuating controller 10 also includes a zener diode 78 connected between the cathode of the first diode 50 and the first resistor 60. An anode of the zener diode 78 is connected to the positive power supply terminal of the first comparator 64 of the timer circuit 44 and the positive power supply terminal of the second comparator 68 of the oscillating circuit 46, so that the positive power supply voltage of the first comparator 64, the positive power supply voltage of the second comparator 68, and the voltage at the junction between the first resistor 60 and the zener diode 78 are all set to the constant voltage Vdd. The constant voltage Vdd may be a voltage (3 through 5 V) that is used in logic circuits. The negative power supply terminal of the first comparator 64 and the negative power supply terminal of the second comparator 68 are both connected to the control input terminal 42.

The actuating controller 10 also has a fourth diode 80 connected in parallel with the first resistor 60. An anode of the fourth diode 80 is connected to the junction between the first resistor 60 and the first capacitor 62, and a cathode thereof is connected to the junction between the first resistor 60 and the zener diode 78.

Operations of the actuating controller 10 thus constructed shall be described below with reference to the signal waveforms shown in FIG. 3.

As shown in FIG. 3, the actuating controller 10 energizes the actuating coil 28 in a rated mode during the first period T1 in the actuation command period Td, and energizes the actuating coil 28 in a power saving mode during a remaining second period T2 in the actuation command period Td.

Initially, the potential V1 at the control input terminal 42 is a high potential, e.g., Vdd, the output voltage V3 of the first comparator 64 is at a high level, e.g., Vdd, and the output voltage V5 of the second comparator 68 is at a high level, e.g., Vdd. Therefore, the gate-to-source voltage of the first transistor 52 is 0 V, thus keeping the first transistor 52 turned off.

At the time t0, when the potential V1 at the control input terminal 42 drops to a low potential, e.g., the ground potential Vss, the actuation command period Td is initiated. The low potential signal applied to the control input terminal 42 in the actuation command signal Td is referred to as the actuation command signal Sa.

As the actuation command period Td begins, the first capacitor 62 starts being charged. The charged voltage V2 across the first capacitor 62 gradually rises, in accordance with the time constant CR of the first resistor 60 and the first capacitor 62. Since the output voltage V3 of the first comparator 64 and the output voltage V5 of the second comparator 68 are kept at the high level Vdd, the gate-to-source voltage of the first transistor 52 turns positive at the starting time t0 of the actuation command signal Td, thus turning on the first transistor 52 to energize the actuating coil 28.

Thereafter, at a time t1, when the charged voltage V2 across the first capacitor 62 exceeds a first threshold voltage Vth1, the output voltage V3 of the first comparator 64 drops to the low level Vss, thus turning off the second transistor 66.

At the time t1, since the input voltage V4 of the second comparator 68 is at the low level Vss, and the output voltage V5 thereof is at the high level Vdd, an electric current flows from the output terminal of the second comparator 68, through the third resistor 74 and the third diode 76, and to the second capacitor 70, thereby charging the second capacitor 70.

At this time, the second capacitor 70 is charged in accordance with the time constant CR of the third resistor 74 and the second capacitor 70. The charged voltage across the second capacitor 70 appears as the input voltage V4 of the second comparator 68. At a time t2, when the input voltage V4 of the second comparator 68 exceeds a first threshold value Vth11, the output voltage V5 of the second comparator 68 drops to the low level Vss. The gate-to-source voltage of the first transistor 52 becomes 0 V, thus turning off the first transistor 52.

The first period T1 extends from the time t0 to the time t2. In the present embodiment, the first resistor 60, the first capacitor 62, and the first threshold voltage Vth1 of the first comparator 64 are set to values such that the first period T1 is 10 msec, for example.

During the first period T1, the oscillating operation of the oscillating circuit 46 is halted, and both the output voltage V3 of the first comparator 64 and the output voltage V5 of the second comparator 68 are kept at the high level Vdd.

During the first period T1, therefore, the first transistor 52 remains energized and applies the rated voltage to the actuating coil 28. In the rated mode, the actuating coil 28 is energized at the rated voltage with a duty ratio of 100%. The first period T1 is set to a sufficient period of time for moving the movable member 26 (see FIG. 1) inside the actuating coil 28 under electromagnetic forces generated by the actuating coil 28 while energized at the rated voltage. Therefore, an amount of electric power, which is large enough to move the movable member 26, is supplied to the actuating coil 28 during the first period T1. During the first period T1, the movable member 26 inside the actuating coil 28 moves toward the fixed iron core 22 and is magnetically attracted to the fixed iron core 22.

At the time t2, when the first period T1 has terminated, the output voltage V5 of the second comparator 68 drops to the low level Vss. The electric charge stored in the second capacitor 70 is discharged through the second resistor 72, the output terminal of the second comparator 68, and the negative power supply terminal of the second comparator 68. Hence, the charged voltage across the second capacitor 70, i.e., the input voltage V4 of the second comparator 68, drops. At this time, the second capacitor 70 is discharged in accordance with the time constant CR of the second resistor 72 and the second capacitor 70.

When the input voltage V4 of the second comparator 68 drops below a second threshold value Vth12, the output voltage V5 of the second comparator 68 increases to the high level Vdd, thereby turning the first transistor 52 on again.

When the output voltage V5 of the second comparator 68 increases to the high level Vdd, the second capacitor 70 is charged. When the input voltage V4 of the second comparator 68 exceeds the first threshold value Vth11, the output voltage V5 of the second comparator 68 decreases to the low level Vss, turning the first transistor 52 off again.

After the first period T1 has elapsed, and during a period Toff in which the first transistor 52 is turned off, the actuating coil 28 is de-energized, and electromagnetic energy stored in the actuating coil 28 is consumed through the second diode 54. In the present embodiment, the turn-off period Toff is set to a short period, e.g., 60 μs. Therefore, the movable member 26 either remains attracted to the fixed iron core 22, or is only slightly spaced from the fixed iron core 22.

After the first period T1 has elapsed, and during a period Ton in which the first transistor 52 is turned on, the actuating coil 28 is energized again, whereupon the movable member 26 remains attracted to the fixed iron core 22, is only slightly spaced from the fixed iron core 22, or is attracted again to the fixed iron core 22 after starting to become spaced from the fixed iron core 22.

The above sequence of operations, during the turn-off period Toff and the turn-on period Ton, is repeated until the actuation command period Td is terminated, so that the actuating coil 28 is energized in the power saving mode. The period from the time t2, when the first period T1 is terminated, to the time t3, when the actuation command period Td is terminated, is referred to as the second period T2. The actuating coil 28 is energized in the power saving mode during the second period T2. The second period T2 may be set to any desired length, depending on the period during which a fluid pressure device to be controlled by the solenoid-operated valve 12 is actuated.

When the potential V1 at the control input terminal 42 becomes the high potential Vdd, the actuation command period Td is terminated. At this time, the electric charge stored in the first capacitor 62 during the actuation command period Td is discharged through the fourth diode 80 and the positive and negative power supply terminals of the first comparator 64, thus resetting the first capacitor 62. Subsequently, at a time t4 when the voltage V2, i.e., the charged voltage across the first capacitor 62, drops below a second threshold voltage Vth2 of the first comparator 64, the output voltage V3 of the first comparator 64 returns again to the high level Vdd, whereupon the actuating controller 10 returns to its initial state.

As described above, the actuating controller 10 includes the timer circuit 44 for setting the first period T1, the oscillating circuit 46 for energizing the actuating coil 28 in the power saving mode during the second period T2, and the control circuit 48, which stops the oscillating operation of the oscillating circuit 46 during the first period T1 based on the output signal from the timer circuit 44, thereby energizing the actuating coil 28 in the rated mode. The timer circuit 44, the oscillating circuit 46, and the control circuit 48 may be implemented using inexpensive gate ICs and transistors. Therefore, the mounting space required by the solenoid-operated valve 12, as well as the cost of the solenoid-operated valve 12, can be reduced.

In particular, the timer circuit 44 includes the fourth diode 80, which serves as a discharging diode. At the time t3, when the actuation command period Td is terminated, the electric charge stored in the first capacitor 62 during the actuation command period Td is discharged through the discharging diode 80, enabling resetting of the first capacitor 62.

Due to specifications of the actuating controller 10, the first period T1 is set to a longer period, and therefore the first capacitor 62 needs to have a larger capacitance. If the first capacitor 62 were to be discharged of its own accord, it would take a longer time until the first capacitor 62 becomes completely discharged. Therefore, it is necessary to set the period from the time t3, when the actuation command period Td is terminated, until the time t0, when a next actuation command period Td begins, to a longer period, which tends to limit the speed of operation of the solenoid-operated valve 12.

However, the discharging diode 80 added to the timer circuit 44 allows electric charges stored in the first capacitor 62 to be discharged in a short time. Therefore, even if the first capacitor 62 has a large capacitance, it can be reset quickly.

In the above embodiment, the fourth diode 80 is connected in parallel with the first resistor 60 through which the first capacitor 62 is discharged. Alternatively, the first capacitor 62 may be discharged through a diode included in the first comparator 64 and which is connected to the input terminal of the first comparator 64.

Since the diode included in the first comparator 64 may double as a discharging diode, the circuit arrangement of the actuating controller may be made simpler and less costly.

Although a certain preferred embodiment of the present invention has been shown and described in detail, it should be understood that various changes and modifications may be made therein without departing from the scope of the appended claims.

What is claimed is:

1. A solenoid-operated valve actuating controller for actuating a solenoid-operated valve by energizing an actuating coil of the solenoid-operated valve in a rated mode, at a rated voltage which is high enough to move a movable member in the actuating coil, during a first period from a time when an actuation command signal is initially and repetitively applied to the solenoid-operated valve, and energizing the actuating coil in a power saving mode, in repetitive cycles at a smaller duty ratio than in said rated mode, during a second period after said first period, said solenoid-operated valve actuating controller comprising:

a timer circuit;
an oscillating circuit for energizing the actuating coil in said power saving mode during said second period; and
a control circuit for stopping an oscillating operation of said oscillating circuit during said first period based on an output signal from said timer circuit, and for energizing said actuating coil in said rated mode,
wherein said timer circuit comprises:
a charging circuit having at least a capacitor, for charging from the time when said actuation command signal is initially applied to the solenoid-operated valve; and
a Schmitt trigger type first comparing circuit having one first input terminal to which a charged voltage in said charging circuit is applied, and for supplying said control circuit with a stop signal for stopping the oscillating operation of said oscillating circuit, until said charged voltage applied to said first input terminal reaches a rated voltage; and
a discharging diode for discharging through said discharging diode electric charges stored in said capacitor, at a time when application of said actuation command signal to the solenoid-operated valve is ended,
wherein said oscillating circuit comprises:
a Schmitt trigger type second comparing circuit having one second input terminal;
a capacitor connected to said second input terminal of said second comparing circuit;
a discharging first resistor connected between said input terminal and an output terminal of the second comparing circuit; and
a series-connected circuit including a charging second resistor and a diode, said series-connected circuit being connected between said input terminal and said output terminal of said second comparing circuit; and
wherein said control circuit comprises a transistor circuit, which applies a fixed voltage to said second input terminal of said second comparing circuit and stops the oscillating operation of said oscillating circuit by performing an ON operation during a period in which said stop signal is supplied, and further which stops the application of said fixed voltage to said second input terminal of said second comparing circuit and causes the oscillating operation of said oscillating circuit to be carried out by performing an OFF operation during a period in which the actuation command signal is applied and during which said stop signal is not applied.

2. A solenoid-operated valve actuating controller according to claim 1, further comprising:
a switching device for energizing said actuating coil, wherein said oscillating circuit outputs intermittent pulses for energizing said actuating coil to said switching device during said second period in said power saving mode, and wherein said control circuit controls outputting of a pulse for energizing said actuating coil to said switching device during said first period in said rated mode.

3. A solenoid-operated valve actuating controller according to claim 1, wherein said first period comprises a combined period made up from a combination of the period in which said stop signal is supplied, and a period, from stoppage of the period in which said stop signal is applied, and until the voltage applied to said second input terminal of said second comparing circuit reaches a threshold value voltage from said fixed voltage.

* * * * *